(12) United States Patent
Lyon

(10) Patent No.: US 11,452,954 B2
(45) Date of Patent: Sep. 27, 2022

(54) FILTER STATUS SENSOR DEVICE, METHOD OF USE, AND AUTOMATIC REPLENISHMENT SYSTEM

(71) Applicant: Kent Lyon, Montgomery, TX (US)

(72) Inventor: Kent Lyon, Montgomery, TX (US)

(*) Notice: Subject to any disclaimer, the term of this patent is extended or adjusted under 35 U.S.C. 154(b) by 0 days.

(21) Appl. No.: 16/203,616

(22) Filed: Nov. 29, 2018

(65) Prior Publication Data

US 2020/0171414 A1  Jun. 4, 2020

(51) Int. Cl.

| | |
|---|---|
| *B01D 35/143* | (2006.01) |
| *B01D 46/00* | (2022.01) |
| *B01D 46/44* | (2006.01) |
| *G01F 1/56* | (2006.01) |
| *G01F 1/88* | (2006.01) |

(52) U.S. Cl.
CPC ....... *B01D 35/143* (2013.01); *B01D 46/0005* (2013.01); *B01D 46/444* (2013.01); *B01D 46/446* (2013.01); *G01F 1/56* (2013.01); *G01F 1/88* (2013.01)

(58) Field of Classification Search
CPC .............. B01D 35/143; B01D 46/0005; B01D 46/444; B01D 46/446; B01D 46/0086; B01D 46/0002; B01D 46/0039; B01D 46/0087; B01D 46/0089; B01D 46/10; B01D 46/448; B01D 46/521; B01D 2201/167; B01D 2201/20; B01D 2201/204; B01D 2201/54; B01D 2247/12; B01D 2247/14; B01D 2273/30; B01D 2275/205; G01F 1/88; G01F 1/05; G01F 1/075; G01F 1/56; G01F 1/58; G01F 1/582; G01F 1/586; G01F 1/588; G01F 1/60; G01F 1/64; G01F 1/69; G01F 1/86; H01H 35/24; H01H 36/00; H01H 36/008; G01L 1/12; G01L 1/122; G01L 19/00; G01L 19/0001; G01L 19/0002
See application file for complete search history.

(56) References Cited

U.S. PATENT DOCUMENTS

| | | | |
|---|---|---|---|
| 2,315,185 A | * | 3/1943 | Boyle ..................... G01P 1/003 73/202 |
| 2,804,839 A | | 9/1957 | Hallinan |
| 2,949,931 A | * | 8/1960 | Ruppright ............... F16K 15/02 137/528 |

(Continued)

*Primary Examiner* — Joseph W Drodge
(74) *Attorney, Agent, or Firm* — Karen B. Tripp

(57) ABSTRACT

A method for determining an airflow volume through an air filter is presented. A negative pressure is created within a system housing of an air handling system. Particulate matter is filtered on a filter media of an air filter. A displaceable baffle is progressively moved baffle in proportion to an accumulation of particulate matter on the filter media, wherein the displaceable baffle is movably mounted within a bypass conduit of an airflow sensor device. An output voltage is identified from a magnetic field sensor, wherein the output voltage is proportional to a magnetic flux density of a magnetic field from an actuation magnet mounted on the displaceable baffle. A position of the displaceable baffle is determined based on the output voltage generated by the magnetic field sensor. An accumulation of particulate matter on the filter media is determined based on the position of the displaceable baffle.

21 Claims, 10 Drawing Sheets

(56) References Cited

U.S. PATENT DOCUMENTS

| | | | |
|---|---|---|---|
| 3,417,795 A * | 12/1968 | Hesse | A61M 16/209 |
| | | | 137/514 |
| 3,890,122 A * | 6/1975 | Frantz | B01D 45/16 |
| | | | 96/400 |
| 3,992,598 A * | 11/1976 | Welsh | H01H 35/405 |
| | | | 200/81.9 M |
| RE30,782 E | 10/1981 | Turnhout | |
| 4,321,070 A | 3/1982 | Bede | |
| 4,813,948 A | 3/1989 | Insley | |
| 5,124,957 A | 6/1992 | Owens et al. | |
| 5,230,800 A | 7/1993 | Nelson | |
| 5,315,838 A | 5/1994 | Thompson | |
| 5,320,136 A * | 6/1994 | Morris | F16K 15/021 |
| | | | 137/516.29 |
| 5,862,737 A | 1/1999 | Chiu et al. | |
| 6,000,417 A * | 12/1999 | Jacobs | F16K 15/023 |
| | | | 137/2 |
| 6,096,224 A | 8/2000 | Champie | |
| 6,535,838 B2 | 3/2003 | Abraham et al. | |
| 7,012,685 B1 * | 3/2006 | Wilson | F24F 8/10 |
| | | | 356/239.1 |
| 9,552,715 B2 | 1/2017 | Breslin | |
| 10,821,388 B2 * | 11/2020 | Alderman | B01D 46/10 |
| 2009/0165664 A1 | 7/2009 | Jones et al. | |
| 2011/0315019 A1 * | 12/2011 | Lyon | B01D 46/0086 |
| | | | 96/418 |
| 2012/0060494 A1 * | 3/2012 | Sato | F02B 37/183 |
| | | | 60/602 |
| 2013/0150225 A1 * | 6/2013 | Katz | B04B 11/02 |
| | | | 494/10 |
| 2015/0285524 A1 * | 10/2015 | Saunders | F24F 7/065 |
| | | | 454/239 |
| 2018/0140989 A1 * | 5/2018 | Arthur | B01D 46/10 |
| 2018/0161531 A1 * | 6/2018 | Costella | A61M 15/0091 |
| 2019/0015768 A1 * | 1/2019 | Alderman | B01D 46/521 |

* cited by examiner

FILTER STATUS SENSOR DEVICE, METHOD OF USE, AND AUTOMATIC REPLENISHMENT SYSTEM

RELATED APPLICATIONS

This application claims the benefit of U.S. Provisional Patent Application No. 62/593,178, filed Nov. 30, 2017, which is incorporated by reference herein in its entirety.

BACKGROUND INFORMATION

1. Field

The present disclosure relates generally to a means for determining the level of particulate matter accumulation onto a fixed filter and, in particular, to the monitoring of degrees of oversaturation and subsequent notification of the user of timely and need for replacement wirelessly.

2. Background

It has long been customary for homes and buildings (via home-owners and commercial occupants) to use an air filter, or more specifically a particulate air filter, comprised of fibrous materials (e.g. fiberglass, polyester, and high-efficiency particulate arrestance filters) to capture and plus remove solid particulates (e.g. dust, pollen, mold and disease-causing bacteria) from the air in an effort to provide residents clean, ventilated air. During use, and over the lifetime of the particulate filter, though, the filter becomes increasingly clogged with the solid particles to the point that airflow across the filter decreases and may result in complete restriction of airflow and eventual failure. The consequential and gradual increasing of limitations on the filters ultimate function and ability to allow for proper airflow applies increased work on the mechanical portion of the ventilation system (the blower motor or fan) enforces this functional element, that part responsible for creating the negative pressure/suction power, to increase output and expend energy that would not be required with a normally functioning, "clean" air filter. This increase in output not only generates increased cost through electrical requirements but also increased costs through adding wear on all moving parts and resulting replacement. Too, as pressure builds, particulate matter may give way and traversed the thickness of the world filter material which will be reintroduced into the system defeating the primary purpose of the filter itself.

To a lesser extreme, even partial capacity and less-than-critical accumulation of particulates can result in a sub optimal functioning of heat producing system, air conditioning system, air purifier, or respirator (e.g. A PARA-powered air purifying system). Clearly, even filters that express accumulation of particulate matter that is any measurable degree less than the point of complete saturation will undoubtedly create an ever-increasing work load and energy output that is directly proportional to its level of permeation.

Determining the level or rate of filter fiber impregnation historically, though, has proven cumulus, messy and lacking in an objective determination of filter capacity. To inspect the filter, an individual must remove the filter and visually inspect the condition of the filter using an entirely subjective means to determine the state of the filter in a primarily binomial pursuit (i.e. judging the filter to be "clean" or "dirty"). Adding to the inaccuracy of determining the condition of the filter, corrugated configurations, and inability to observe non-visible areas of the filter, and often color (without points of reference) can make visual inspection difficult if not impossible.

With regard to the aforementioned infirmities, it has become incumbent upon many inventors to seek to determine (1) what is the degree of saturation of a given filter, (2) when is a filter partially or completely incapacitated in its function, and ultimately, (3) at what point do I change my filter. The following are the attempts to address such issues:

Perhaps the most rudimentary means to change an air filter is temporally. As evidenced in U.S. Pat. No. 5,124,957, the invention granted to Owen et al. discloses "a housing containing logic circuitry to effect a selective visual and audible signal in conjunction with a really hot and selected month, date, and time preset by an individual" whereby the onus is upon the user to preselected time by which the filter is to be changed. This invention does not, however, take into consideration the filter type, season (winter, spring, summer or fall), the geometrical layout of the house or facilities serviced, the square footage filter, the geographical parameters (e.g. high humidity, low humidity, high or low heat, flora and fauna, etc.). Clearly, given the multitude of changing variables to be considered, the invention of the '957 patent leaves much to be desired in determining the state of a filter.

Other inventions have focused on the actuation of a pressure-differential switch that is activated by analyzing the flow rate through a pressure to the high-pressure side and/or the low-pressure side of a filter (See U.S. Pat. No. 6,096,224 issued to Champie). Although relying on pressure differential, the invention risks the ultimate clogging up the tube itself as opposed to the filter.

U.S. Pat. No. 5,315,838, issued to Thompson, provides an invention that provides a visual indicator where in the occurrence of a negative air pressure differential in the instance of a clogged air filter exert sufficient force against an air reaction surface to overcome a biasing means and extend the visual indicator to an outward extended position. Similarly, Chiu et al. (U.S. Pat. No. 5,862,737) describes a tube containing a float influenced by a predetermined pressure differential that elevates the float into a viewing window upon exertion of a lifting force. These devices, though, offer little advantage over visual inspection.

Attempts have been made to provide sound alerts as to the status of a filter. Both Bede and Hallinan (U.S. Pat. Nos. 4,321,070 and 2,804,839, respectively) provide for "whistle" systems that create alerts based on pressure differentials. Bede's '070 description outlining one single whistle and Hallinan's '839 patent disclosing from a "plurality of whistles" where "each being actuated to give an audible signal at a different range of pressure, whereby the increased clogging of the filter produces an increased magnitude of sound by actuating a plurality of said whistles". While this is an improvement over visual inspection, a single whistle (or even multiple whistles) lack specificity, may as well clogged, and, moreover, could provide an annoyance and to frequent filter changes—and equally troublesome result.

In addition to a visual indicator, Campbell (U.S. Pat. Application No. 2009/0165644 discloses flow rate sensor, interface, and microprocessor that provides the addition of a "visual and auditory indicator" where the auditory indicator is "moving coil type speaker, piezoelectric type speaker, or the like" and the visual indicator is in the form of an "an incandescent light bulb, florescent light bulb, LED, OLE DB, LCD, Display, or the like". In short, during normal operation, the output of the anemometer is continuously monitored and compared to the upper limit value, as the filter clogs and the anemometer slows so too does the sample output voltage and logic circuit triggers auditory and/or visual indicators. Camels application, though, consists of several deficiencies not encountered by the present invention including a movable and mechanically wearable parts including an electricity generating rotating vane anemometer, a complex system of flow rate sensor and information receiving interface requiring programming a threshold value coupled with a plurality of switches, a series of indicators, and a microprocessor, the requirement of a large amount of "electronic" or "battery" power supply for consistent monitoring, and simplistic indicators of filter condition—all addressed with the present application.

Too, inventors have contemplated devices that measure the air pressure differential across a filter and reports filter status data wirelessly. Breslin does this by measuring the ambient the air low pressure side against an internalized, "high side pickup" measured here via a differential pressure switch to determine the status (See U.S. Pat. No. 9,552,715) and transmitting data wirelessly to anyone a number of electronic devices. Likewise, U.S. Pat. No. 6,535,838 issued to Abraham advances a method for determining filter status by "pressure differential across the filter for identifying a clogged filter" in an attempt to aid in an overall furnace diagnostic system "in real time" which is accessed through a handheld device utilizing similar means of detection but with an "infrared link". Yet, while Breslin incorporates wireless transmission of collected data results to the user, the '715 "patent does not provide for the efficiency and functionality of the present invention in that it (1) requires installation into the pre-existing thermostat, (2) relies upon overly complicated mechanisms to determine filter status (e.g. a differential pressure switch, chipset, and initial determinations and subsequent determinations based on pre- and post-sampling), (3) suffers from inexact determinations of "clean", "dirty" and "slightly dirty", (4) relies upon a power source via the thermostat, (5) is overly mechanized, and (6) does not contemplate for the direct ordering of a predetermined filter by size, quality, and price. Moreover, the '838 patent (1) fails to incorporate data storage to provide historical data versus updated data to determine if and when a filter should be replaced, (2) is singularly directed towards a furnace filter, (3) is diagnostic in nature (as opposed to preventative or monitoring), (4) requires the use of a "handheld device", and (5) requires the insertion of an intermediary (a technician to operate the detection device)—all providing little improvement over visual inspection. All deficiencies are addressed herein.

Therefore, it would be desirable to have a method and apparatus that take into account at least some of the issues discussed above, as well as other possible issues. For example, it would be desirable to have a method and apparatus that overcome a technical problem with determining the level or rate of filter fiber impregnation.

SUMMARY

An embodiment of the present disclosure provides an airflow sensor device comprising a sensor housing having a bypass conduit, a displaceable baffle, a magnetic field sensor, and an embedded processing system. The displaceable baffle is movably mounted within the bypass conduit. The magnetic field sensor is mounted within the sensor housing and configured to generate an output voltage. The embedded processing system is mounted within the sensor housing and operatively connected to the magnetic field sensor, which is configured to determine a position of the displaceable baffle based on the output voltage generated by the magnetic field sensor.

Another embodiment of the present disclosure provides an air filter comprising a filter media and an airflow sensor device attached to the filter media. The airflow sensor device comprises a sensor housing having a bypass conduit; a displaceable baffle which is movably mounted within the bypass conduit; a magnetic field sensor which is mounted within the sensor housing and configured to generate an output voltage; and an embedded processing system which is mounted within the sensor housing and operatively connected to the magnetic field sensor and configured to determine a position of the displaceable baffle based on the output voltage generated by the magnetic field sensor. The displaceable baffle progressively moves within the bypass conduit in response to changes to a pressure differential across the displaceable baffle in proportion to an accumulation of particulate matter on the filter media.

Yet another embodiment of the present disclosure provides an air handling system comprising a fan configured to create a negative pressure within a system housing; an air filter having a filter frame circumscribing a filter media; and an airflow sensor device which is attached to the filter media.

Another embodiment of the present disclosure provides a method for determining an airflow volume through an air filter. A negative pressure is created within a system housing of an air handling system. Particulate matter is filtered on a filter media of an air filter. A displaceable baffle is progressively moved baffle in proportion to an accumulation of particulate matter on the filter media, wherein the displaceable baffle is movably mounted within a bypass conduit of an airflow sensor device. An output voltage is identified from a magnetic field sensor, wherein the output voltage is proportional to a magnetic flux density of a magnetic field from an actuation magnet mounted on the displaceable baffle. A position of the displaceable baffle is determined based on the output voltage generated by the magnetic field sensor. An accumulation of particulate matter on the filter media is determined based on the position of the displaceable baffle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a method, an apparatus, a system, and a computer program product that processes documents in a manner that reduces time needed to process these documents. The illustrative embodiments also recognize and take into account that having employees process submission of the documents can result in errors during processing of the documents. The illustrative embodiments recognize and take into account that implementing a process that removes human error in the processing of the documents is desirable.

Thus, the illustrative embodiments provide a method, an apparatus, and a system, for determining the level of particulate matter having accumulated onto the outer surface of a stationary filter for monitoring degrees of filter saturation by particulate matter, and for subsequent notification on a periodic basis of filter status and need for replacement to a user through wireless communication. Information is calculated, gathered and wirelessly transmitted to an electronic device, such as a smart phone, tablet, computer, or similar device. The transmitted information alerts the user of the condition and status of the filter.

In one illustrative example, an airflow sensor device is provided. The airflow sensor device comprises a sensor housing having a bypass conduit, a displaceable baffle is movably mounted within the bypass conduit. The displaceable baffle is configured to move within the bypass conduit in response to a pressure differential across the displaceable baffle. A magnetic field sensor, mounted within the sensor housing, is configured to generate an output voltage. The magnetic field sensor generates the output voltage in proportion to a magnetic flux density of a magnetic field from an actuation magnet mounted on the displaceable baffle. An embedded processing system is mounted within the sensor housing and operatively connected to the magnetic field sensor. An embedded processing system is configured to identify a position of the displaceable baffle based on the output voltage generated by the magnetic field sensor. An accumulation of particulate matter on the filter media is determined based on the position of the displaceable baffle.

Figure 1:
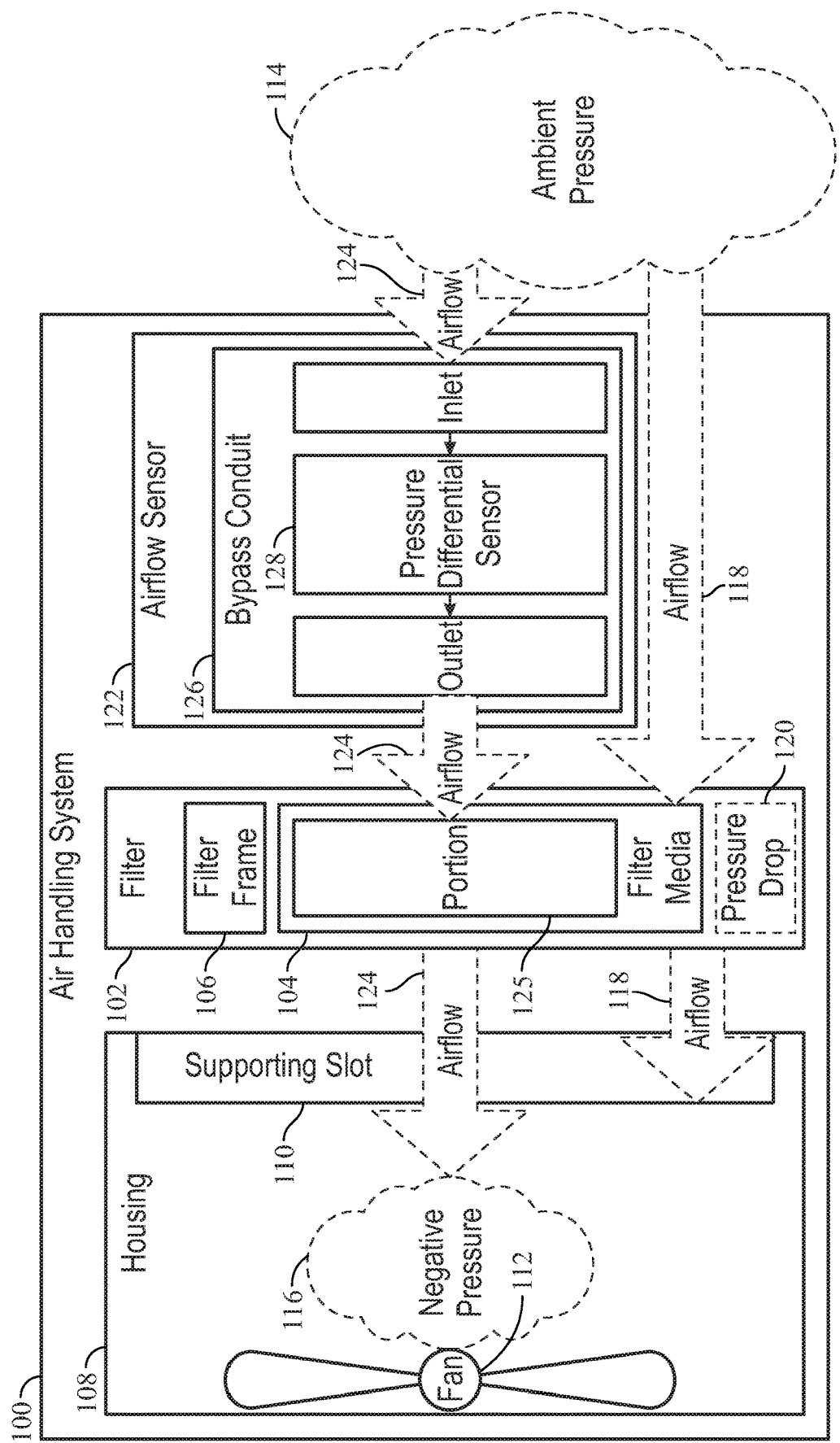
FIG. 1 is a block diagram of an air handling system in which illustrative embodiments may be implemented.

With reference now to the figures and, in particular, with reference to FIG. 1, a block diagram of an air handling system 100 is depicted in accordance with an illustrative embodiment. In this example, air handling system 100 is a system that operates to provide air ventilation, movement, filtration, or combinations thereof. For example, air handling system 100 can be a furnace, an air-conditioner, a room air purifier, a respirator, and other system suitable air systems that utilize a filter. In one illustrative example, air handling system 100 is a heating, ventilation, and air-conditioning (HVAC) system.

In this illustrative example, air handling system 100 includes filter 102. Generally, the filter 102 includes a filter media 104 surrounded and contained by a filter frame 106. Each of the filter media 104 and the filter frame 106 may be disposable or reusable. For example, filter 102 may consist of at least one of a disposable filter media 104, a reusable filter media 104, a disposable filter frame 106, a reusable filter frame 106, and combinations thereof.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Filter media 104 may be constructed of at least one of paper; porous films of thermoplastic or thermoset materials; nonwoven, as well as melt blown or spun bond, webs of synthetic or natural fibers; scrims; woven or knitted materials; foams; electret or electrostatically charged materials; fiberglass media, laminates or composites of two or more materials thereof, as well as other suitable materials. In one illustrative example, filter media 104 may be a nonwoven polymeric web of polyolefin, polyethylene or polypropylene fibers.

Filter media 104 may also include sorbents, catalysts, activated carbon, and combinations thereof, provided in the form of granules, fibers, fabric, molded shapes, and combinations thereof. For example, electric filter "webs" can be formed of split fibrillated charged fibers, formed into a nonwoven web and joined to a supporting scrim. Alternatively, filter media 104 can be a melt blown microfiber nonwoven web, which can be joined to a support layer during web formation.

Filter frame 106 generally surrounds and supports filter media 104. Filter frame 106 may be constructed of, for example, at least one of paper, chipboard, cardboard, paper board, box board, film, metal, plastic, and combinations thereof. For example, when the entirety of filter 102, including filter frame 106, is disposable, filter frame 106 may be constructed of a paper product. Alternatively, when filter media 104 is disposable and can be removably secured within filter frame 106 that is reusable, filter frame 106 may be constructed of plastic or metal.

Filter 102 is removably retained in housing 108 of air handling system 100. Housing 108 may be a portion of air handling system 100. Particularly, filter 102 may be inserted or otherwise attached to housing 108 at supporting slot 110, which is configured to closely engage filter frame 106 of filter 102.

Air handling system 100 includes fan 112, disposed within housing 108. Compared to ambient pressure 114, fan 112 creates a zone of negative pressure 116 within housing 108. This pressure differential results in airflow 118, pulling ambient air across filter 102 and into housing 108.

As ambient air passes through filter 102, filter media 104 becomes increasingly clogged with particulate matter, such as for example dirt, dust, and debris. As additional particular matter accumulates, airflow 118 is restricted, resulting in an increase in pressure drop 120 across filter 102.

Air handling system 100 includes airflow sensor 122 that is positioned over portion 125 of filter media 104. Airflow sensor 122 monitors airflow 124 through bypass conduit 126 to determine the relative level of accumulation of particulate matter within filter 102.

Bypass conduit 126 is a channel that allows airflow 124 through airflow sensor 122. As filter media 104 becomes increasingly saturated, portion 125 remains comparatively unsaturated relative to the remainder of filter media 104. In this manner, portion 125 increasingly becomes relatively less resistive such that airflow 118 increases through bypass conduit 206 relative to airflow 124 through the remainder of filter media 104.

As compared to the entire surface of filter media 104, bypass conduit 126 has a constricted diameter that causes negative pressure 116 to be distributed over a smaller area. AS portion 125 becomes relatively less resistive, the velocity of airflow 124 becomes greater than the velocity of airflow 118. Accordingly, airflow 124 through bypass conduit 126 can be more easily measured than airflow 118.

Pressure differential sensor 128 is disposed within bypass conduit 126. As filter media 104 becomes increasingly clogged with particulate matter, pressure differential sensor 128 reacts pressure changes in a manner that allows for determination of the relative level of accumulation of particulate matter within filter 102.

For example, fan 112 pulls air through the filter 102. As filter media 104 becomes clogged, airflow 118 through filter media 104 decreases, causing an increase pressure drop 120. Pressure differential sensor 128 may react to static pressure changes between ambient pressure 114 and negative pressure 116.

Additionally, as filter media 104 becomes increasingly clogged and negative pressure 116 increases, portion 125 remains comparatively unsaturated relative to the remainder of filter media 104. In this manner, portion 125 increasingly becomes relatively less resistive such that airflow 118 increases through bypass conduit 206 relative to airflow 124 through the remainder of filter media 104.

Pressure differential sensor 128 may react to changes in dynamic pressure as velocity of airflow 124 through bypass conduit 126 increases. Additionally, as compared to the entire surface of filter media 104, bypass conduit 126 has a constricted diameter that causes negative pressure 116 to be distributed over a smaller area. As portion 125 becomes relatively less resistive, the velocity of airflow 124 becomes greater than the velocity of airflow 118. This greater velocity of airflow 118 through bypass conduit 126 enables Pressure differential sensor 128 to more accurately determine filter saturation and pressure drop 120 as compared to devices that measure airflow 124.

Figure 2:
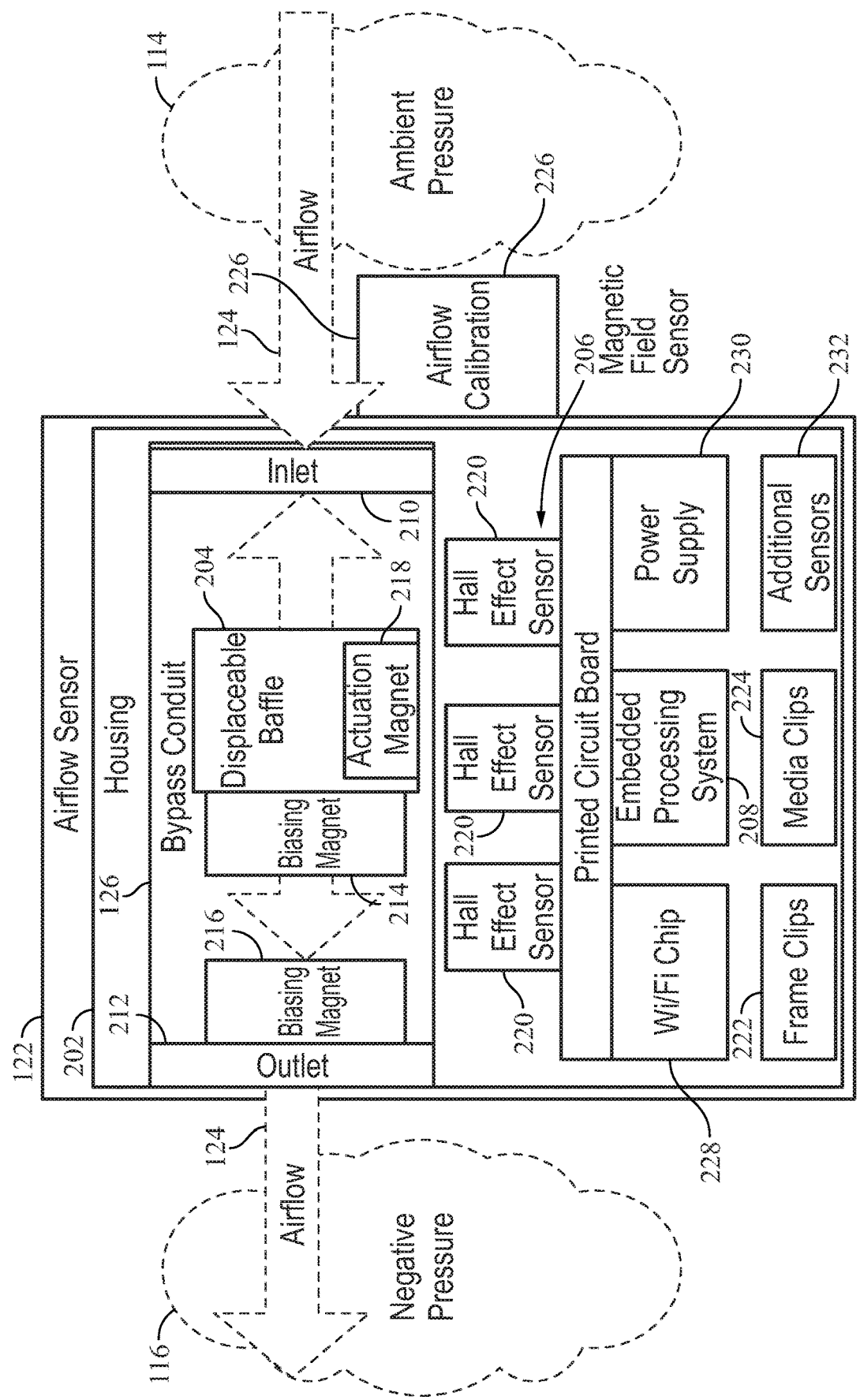
FIG. 2 is a block diagram of an airflow sensor in accordance with an illustrative embodiment.

With reference to FIG. 2, a block diagram of an airflow sensor is depicted in accordance with an illustrative embodiment. As depicted, the airflow sensor of FIG. 2 is airflow sensor 122 of FIG. 1.

Airflow sensor 122 can include a number of different components. As used herein, "a number of" means one or more components. As depicted, airflow sensor 122 includes sensor housing 202, displaceable baffle 204, magnetic field sensor 206, and embedded processing system 208.

As depicted, sensor housing 202 includes bypass conduit 126 defining inlet 210 and outlet 212 for airflow 124. Bypass conduit 126 extends from inlet 210 on a first side of sensor housing 202 to outlet 212 on a second side of sensor housing 202.

Displaceable baffle 204 is movably mounted within bypass conduit 126. Displaceable baffle 204 is configured to move within bypass conduit 126 in response to a pressure differential across the displaceable baffle 204.

In one illustrative example, biasing magnet 214 and biasing magnet 216 magnetically suspend displaceable baffle 204 within bypass conduit 126. Biasing magnet 214 and biasing magnet 216 are configured with opposing polarity (i.e. North to North or South to South), biasing displaceable baffle 204 toward inlet 210 and away from outlet 212.

As filter media 104 of FIG. 1 becomes increasingly clogged with particulate matter, displaceable baffle 204 reacts to changes in negative pressure 116 and airflow 124. Functionally, displaceable baffle 204 acts as a magnetically-biased check valve. As the filter media becomes increasingly clogged, the force applied to displaceable baffle 204 due to changes in negative pressure 116 and airflow 124 overcome the natural polar repulsion between biasing magnet 214 and biasing magnet 216. Biasing magnet 214 and biasing magnet 216 create a hovering effect; displaceable baffle 204 levitates within bypass conduit 126 at a point where the magnetic repulsion force approximately balances the pressure differential force across displaceable baffle 204. Therefore, as the filter becomes increasingly clogged with particulate matter, displaceable baffle 204 is increasingly forced toward outlet 212 and into closer proximity with filter 102 of FIG. 1.

The terms "approximately", "about", and "substantially", as used herein, represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Magnetic field sensor 206 is mounted within the sensor housing 202. Magnetic field sensor 206 is a number of transducers that is configured to generate an output voltage. Magnetic field sensor 206 generates an output voltage in response to a magnetic field. In one illustrative example, magnetic field sensor 206 generates the output voltage in proportion to a magnetic flux density of a magnetic field.

In one illustrative example, magnetic field sensor 206 comprises one or more Hall effect sensor 220. In one illustrative example, Hall effect sensor 220 generates an output signal in proportion to a magnetic flux density of a magnetic field from an actuation magnet 218 mounted on the displaceable baffle 204. This output signal can be delivered, for example, as an analog output voltage, a pulse-width-modulated signal (PWM) or a modern bus protocol (SENT).

Functionally, as displaceable baffle 204 is increasingly forced toward outlet 212 and into closer proximity with filter 102, actuation magnet 218 moves relative to Hall effect sensor 220. As actuation magnet 218 (in the corresponding magnetic field) moves relative to Hall effect sensor 220, the magnetic flux density applied to Hall effect sensor 220 changes correspondingly. Hall effect sensor 220 generates an output signal in proportion to a magnetic flux density of a magnetic field from an actuation magnet 218. In this manner, the output signal generated by a Hall effect sensor 220 is directly related to the amount of particulate matter entrapped by filter 102.

Embedded processing system 208 is mounted within the sensor housing 202 and operatively connected to the magnetic field sensor 206. Embedded processing system 208 is configured to determine a position of the displaceable baffle 204 based on the output signal generated by the magnetic field sensor 220.

Hall effect sensor 220 generates an output signal in proportion to a magnetic flux density of a magnetic field from an actuation magnet 218 mounted on the displaceable baffle 204. With a known magnetic field from actuation magnet 218, Embedded processing system 208 can be determine the position of the displaceable baffle 204 based on the output signal generated by the magnetic field sensor 220.

Airflow sensor 122 can include a number of additional components. As depicted, airflow sensor 122 can additionally include frame clips 222, media clips 224, airflow calibration 226, Wi-Fi chip 228, and power supply 230.

Frame clips 222 are fasteners that facilitate attaching airflow sensor 122 to filter frame 106 of FIG. 1. Frame clips 222 may associated with a first side of housing 202.

Media clips 224 are fasteners that facilitate attachment of housing 202 to the filter medium, creating a better seal and more consistent position. Media clips 224 may associated with a second side of housing 202.

Airflow calibration 226 is used to restrict air flow 124 through bypass conduit 126, allowing airflow sensor 122 to be calibrated for different filter types and HVAC systems. The size and the rating of the filter, and the size of the ducted work and the HVAC system blower motor setting all effect the differential pressure. In one illustrative example, airflow calibration 226 is a rotatable plate, adjustably obscuring a portion of inlet 210. For example, when the filter type and the HVAC system fan motor settings are such that displaceable baffle 204 is pushed open by the differential pressure, airflow calibration 226 is used to restrict air flow through the bypass conduit 126, calibrating displaceable baffle 204 back to an initial closed position that is proximate to inlet 210.

Movement position data of displaceable baffle 204, as reported by magnetic field sensor 206, is ultimately reported via a Wi-Fi chip with full TCP/IP (Transmission Control Protocol/Internet protocol) stack and microcontroller unit (MCU) 132, hereinafter delineated "Chip" 132. The chip records, stores, and transmit the position data of displaceable baffle 204 to a server by way of the users home Internet system. The data is analyzed against a predetermined threshold level (determined at the time of initial device placement) and wherein the data reaches that threshold level, an indication can be made to change the filter 200 by way of a text message or e-mail to the user. Additionally, the system can be configured by the user to automatically whenever a replacement filter for home delivery via an automatic replenishment system. The system allows the user to record their preferred filter quality, record required filter size, and design cost. Once configured in this manner, the filter sensor device the automatic replenishment system allows the user to be reminded and notified to change their clogged air filter by delivery of replacement air filter that is delivered directly to their home.

Figure 3:
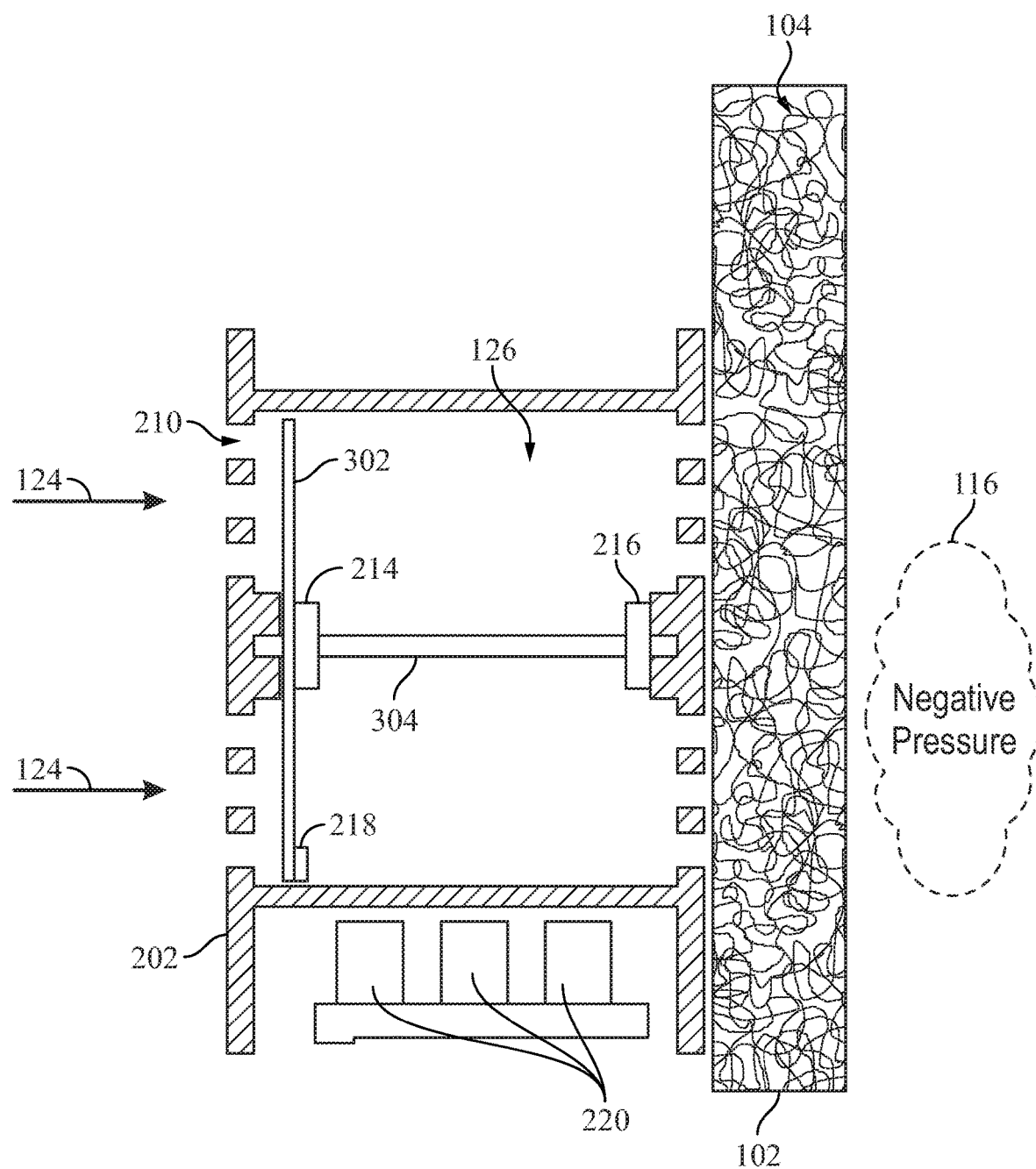
FIG. 3 is a diagram of a side view of airflow through the airflow sensor in an unclogged status in accordance with a first illustrative embodiment.
Figure 4:
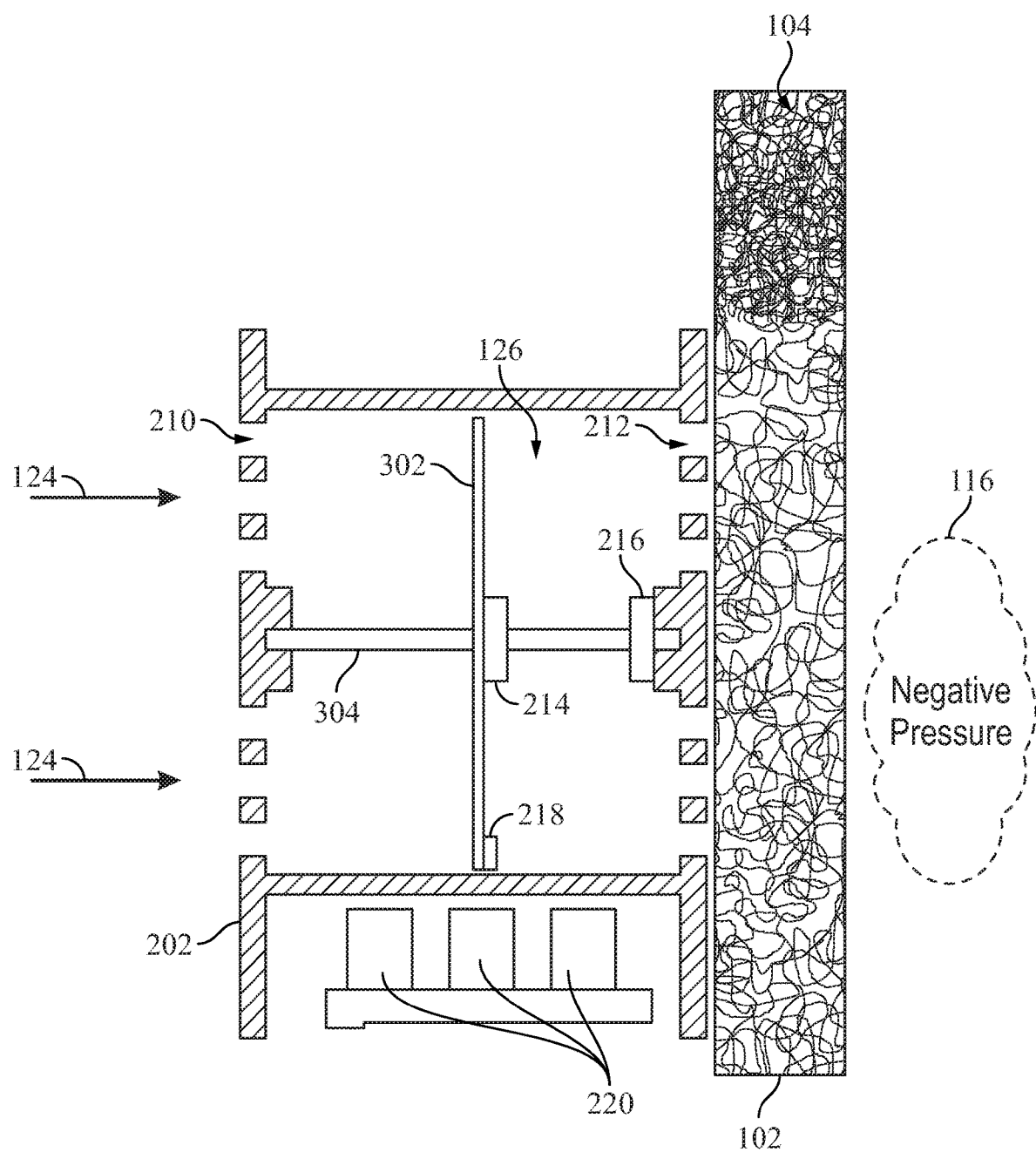
FIG. 4 is a diagram of a side view of airflow through the airflow sensor in a medium clogged status in accordance with a first illustrative embodiment.
Figure 5:
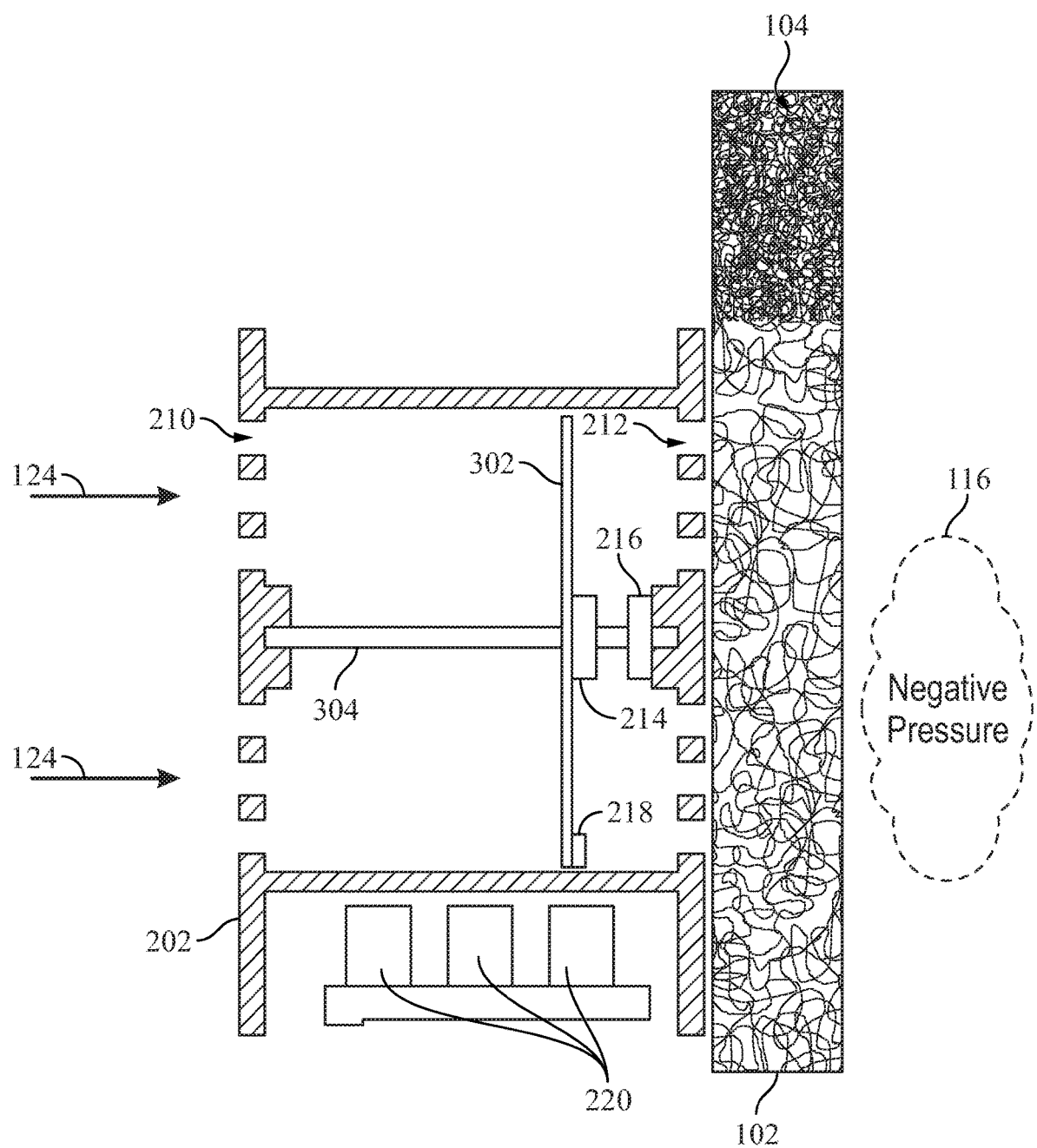
FIG. 5 is a diagram of a side view of airflow through the airflow sensor in a will clogged status in accordance with a first illustrative embodiment.

With reference next to FIGS. 3-5, a series of block diagrams illustrating progressive movement of a displaceable baffle in response to particulate accumulation within an air filter is depicted according to a first illustrative embodiment. is centrally mounted within the bypass conduit via a central axis, and wherein the magnetically-biased check valve moves with in the bypass conduit via linear displacement along the central axis In this illustrative example, displaceable baffle 204 of FIG. 2 is embodied as levitating circular disc 302, secured spatially within bypass conduit 126 on central axis 304, and centrally mounted thereon. Central axis 304 is perpendicularly situated within bypass conduit 126, such that circular disc 302 moves with in the bypass conduit 126 via linear displacement along the central axis 304 in response to the changing pressure differential across circular disc 302.

Referring now to FIG. 3, filter 102 is illustrated in a relatively unsaturated state. Circular disc 302 levitates within bypass conduit 126 at a point where the magnetic repulsion force between biasing magnet 214 and biasing magnet 216 approximately balances the force applied to displaceable baffle 204 due to negative pressure 116 and airflow 124. Because filter 102 is in a relatively unsaturated state, circular disc 302 levitates within bypass conduit 126 at relatively closed position, proximate to inlet 210, and distal from the filter media 104.

As the filter 102 becomes more saturated with particular matter, the forces due to negative pressure 116 and airflow 124 increase. Portion 125, shown in block form in FIG. 1, remains comparatively unsaturated relative to the remainder of filter media 104. As the rest of the filter media 104 becomes saturated, portion 125 increasingly becomes the path of least resistance such that airflow 118 increases through bypass conduit 206.

Circular disc 302 is progressively forced closer to filter media as negative pressure 116 and airflow 124 progressively overcome the magnetic repulsion force between biasing magnet 214 and biasing magnet 216. As illustrated in FIG. 4, filter 102 is in an intermediate saturation state. Circular disc 302 levitates within bypass conduit 126 at an intermediate position between inlet 210 and outlet 212.

As illustrated in FIG. 5, filter 102 is in a relatively saturated state. Circular disc 302 levitates within bypass conduit 126 at relatively open position, proximate to the filter media 104, and distal from inlet 210.

As illustrated in FIGS. 3-5, as circular disc 302 is progressively forced towards filter media, actuation magnet 218 located on circular disc 302 actuate Hall effect sensors 220. For example, where multiple Hall effect sensors 220 are stacked in a series along the length of bypass conduit 126, Hall effect sensors 220 generates an electrical signal according to the local magnetic flux density.

Figure 6:
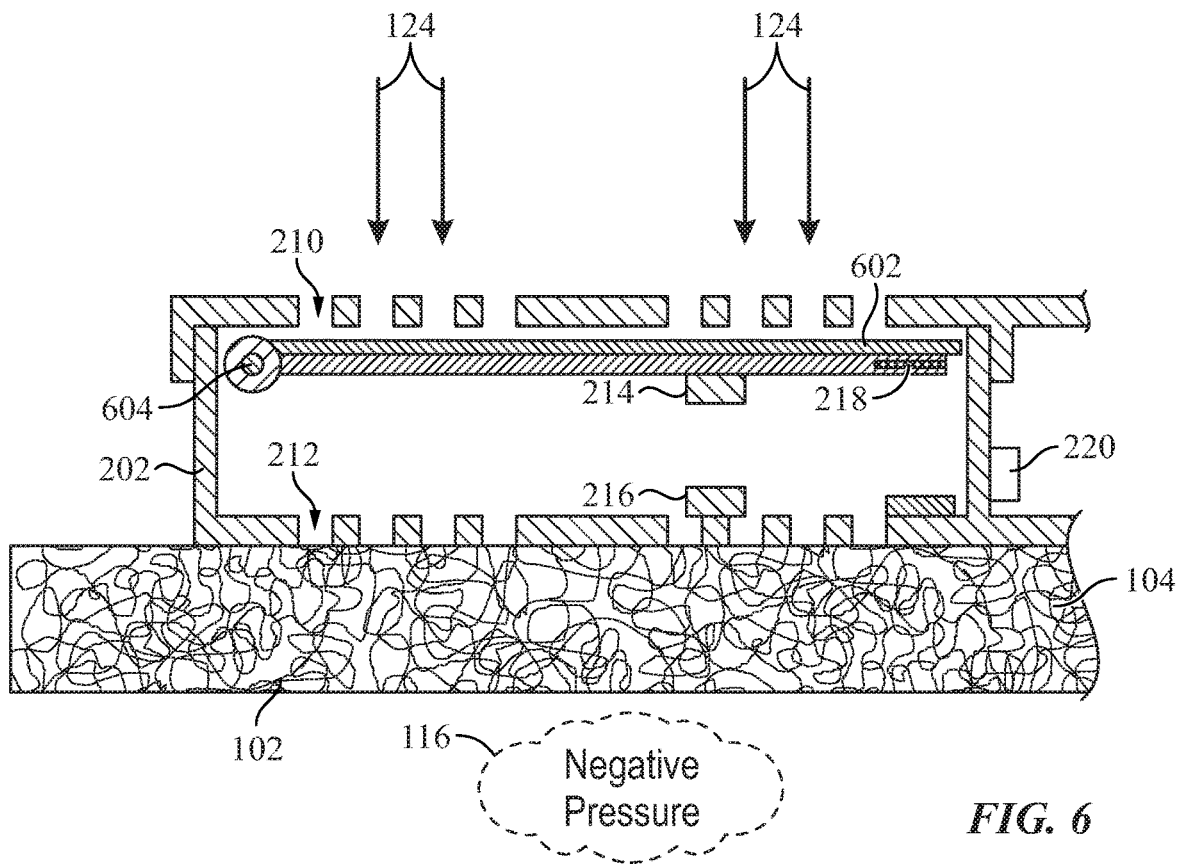
FIG. 6 is a diagram of a side view of airflow through the airflow sensor in an unclogged status in accordance with a second illustrative embodiment.
Figure 7:
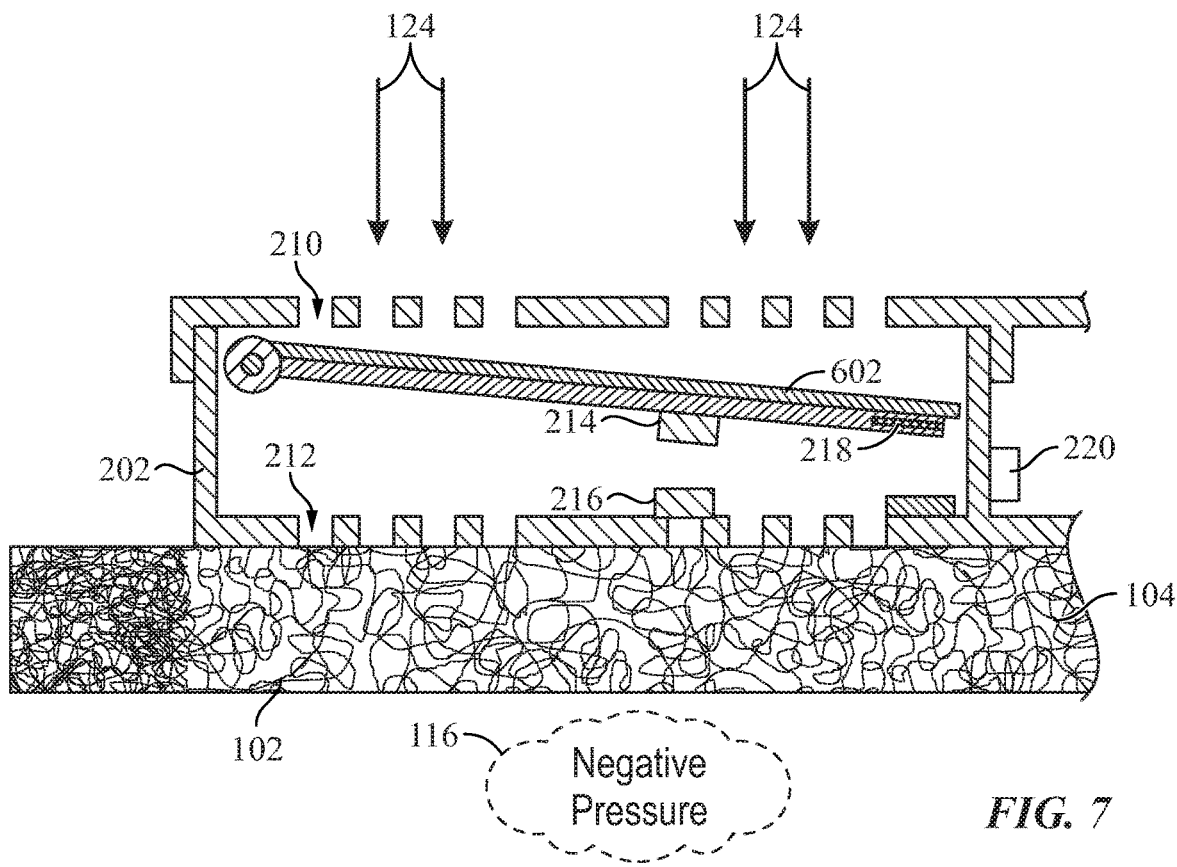
FIG. 7 is a diagram of a side view of airflow through the airflow sensor in a medium clogged status in accordance with a second illustrative embodiment.
Figure 8:
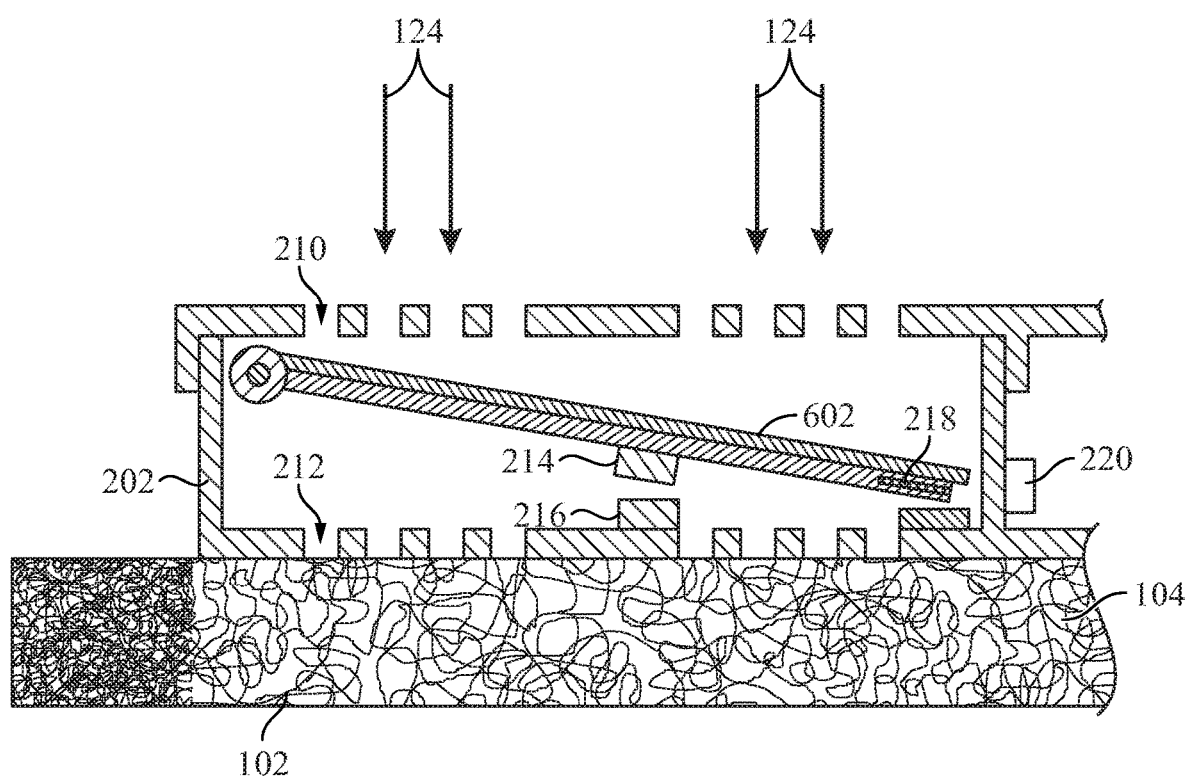
FIG. 8 is a diagram of a side view of airflow through the airflow sensor in a will clogged status in accordance with a second illustrative embodiment.

With reference next to FIGS. 6-8, a series of block diagrams illustrating progressive movement of a displaceable baffle in response to particulate accumulation within an air filter is depicted according to a second illustrative embodiment. It was also determined that the air flow mechanism allows for more precise calibration by adjusting the opening on hinge side of the actuation gate.

In this illustrative example, displaceable baffle 204 of FIG. 2 is embodied as levitating gate 602, proximately attached at the bypass conduit 126 via hinge 604. Gate 602 moves with in the bypass conduit 126 via rotation around the hinge 604 in response to the changing pressure differential across levitating gate 602.

When implemented in combination with airflow calibration 226 of FIG. 2, airflow calibration 226 preferably opens over a "hinge side" of gate 602, facilitating more precise calibration of airflow 124.

Referring now to FIG. 6, filter 102 is illustrated in a relatively unsaturated state. Gate 602 rotates around the hinge 604 and within bypass conduit 126 to an equilibrium point where the magnetic repulsion force between biasing magnet 214 and biasing magnet 216 approximately balances the force applied to displaceable baffle 204 due to negative pressure 116 and airflow 124. Because filter 102 is in a relatively unsaturated state, gate 602 rotates around hinge 604 and within bypass conduit 126 to relatively closed position, proximate to inlet 210, and distal from the filter media 104.

As the filter 102 becomes more saturated with particular matter, the forces due to negative pressure 116 and airflow 124 increase. Portion 125, shown in block form in FIG. 1, remains comparatively unsaturated relative to the remainder of filter media 104. As the rest of the filter media 104 becomes saturated, portion 125 increasingly becomes the path of least resistance such that airflow 118 increases through bypass conduit 206.

Gate 602 is progressively forced closer to filter media as negative pressure 116 and airflow 124 progressively overcome the magnetic repulsion force between biasing magnet 214 and biasing magnet 216. As illustrated in FIG. 7, filter 102 is in an intermediate saturation state. Gate 602 rotates around hinge 604 and within bypass conduit 126 to equilibrium at an intermediate position between inlet 210 and outlet 212.

As illustrated in FIG. 8, filter 102 is in a relatively saturated state. Gate 602 rotates around hinge 604 and within bypass conduit 126 to equilibrium at relatively open position, proximate to the filter media 104, and distal from inlet 210.

As illustrated in FIG. 6-8, as gate 602 is progressively forced to rotate around hinge 604 and towards filter media, actuation magnet 218 located on circular disc 302 actuate Hall effect sensors 220. For example, as actuation magnet 218 rotates proximately closer to Hall effect sensors 220, the output of Hall effect sensors 220 changes proportionally with the changing local magnetic flux density.

Figure 9:
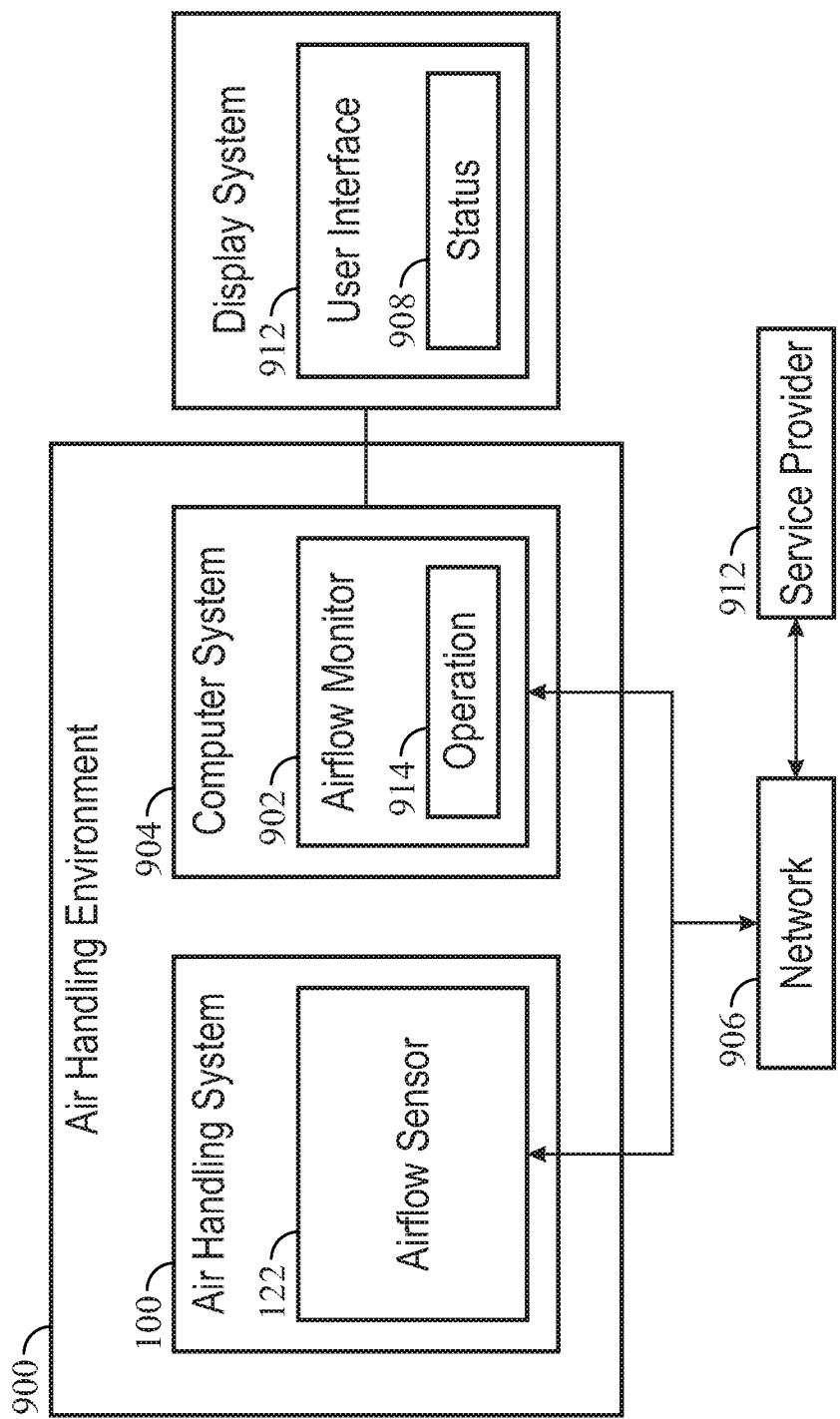
FIG. 9 is a block diagram of an air handling environment in which illustrative embodiments may be implemented.

With reference now to the figures and, in particular, with reference to FIG. 9, an illustration of a block diagram of an air handling environment is depicted in accordance with an illustrative embodiment. As depicted, air handling environment 900 includes air handling system 100.

In this illustrative example, Air Handling Environment 900 includes airflow monitor 902. Airflow monitor 902 may be implemented in computer system 904.

Computer system 904 is a physical hardware system and includes one or more data processing systems. When more than one data processing system is present, those data processing systems may be in communication with each other using a communications medium. The communications medium may be a network, such as network 906. The data processing systems may be selected from at least one of a computer, a server computer, a workstation, a tablet computer, a laptop computer, a mobile phone, or some other suitable data processing system.

In this illustrative example, airflow monitor 902 receives information from airflow sensor 122. For example, in one illustrative embodiment, airflow sensor 122 monitors the condition and status of an air filter by reading and recording information on a periodic basis, such as for example once per hour, once over a 24-hour period, or other suitable periodic intervals. Airflow sensor 122 in essence "wakes" and "sleeps" at preset or predetermined times, in effort to function for extended. With a lifespan that requires less operational power.

Airflow monitor 902 may be implemented in software, hardware, firmware, or a combination thereof. When software is used, the operations performed by airflow monitor 902 may be implemented in program code configured to run on hardware, such as a processor unit. When firmware is used, the operations performed by airflow monitor 902 may be implemented in program code and data and stored in persistent memory to run on a processor unit. When hardware is employed, the hardware may include circuits that operate to perform the operations in airflow monitor 902.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Airflow monitor 902 performs one or more operations. For example, airflow monitor 902 can perform one or more of monitoring the status of an air filter, monitoring the status of a power supplies associated with airflow sensor 122, and reporting the degree of saturation of the filter wirelessly to a user via an application at predetermined dates or times. Additionally, airflow monitor 902 can be programmed with a set of factory settings or consumer customizations for automatically performing operation 906 based on the status of filter 102.

In one illustrative example, airflow monitor 902 can digitally presents status 908 of filter 102. In this illustrative example, computer system 114 can display status 908 on display system 910. In this illustrative example, display system 910 can be a group of display devices. A display device in display system 910 may be selected from one of a liquid crystal display (LCD), a light emitting diode (LED) display, an organic light emitting diode (OLED) display, and other suitable types of display devices.

In this illustrative example, status 908 is displayed in graphical user interface 912 on display system 910. An operator may perform operations 122 by interacting with graphical user interface 912 through user input generated by one or more of user input device 148, such as, for example, a mouse, a keyboard, a trackball, a touchscreen, a stylus, or some other suitable type of user input device.

In one illustrative example, airflow monitor 902 automatically performs operations 906 based on monitoring information received from airflow sensor 122. For example, airflow monitor 902 may be configured to perform operations 906 with respect to one or more service providers 912.

For example, airflow monitor 902 may be configured to automatically perform operations 906 to replace filter 102. When airflow monitor 902 determines a particular level of saturation based on monitoring information from airflow sensor 122, airflow monitor 902 may automatically contact service provider 912. In this illustrative embodiment, service provider 912 can be any one of a number of electronic retail, online commerce Internet retail services, as well as air filter manufacturers or distributors. At least one of airflow monitor 902 or service provider 912 can then generate a purchase order for a replacement filter.

In another illustrative example, airflow monitor 902 may be configured to automatically perform operations 914 that initiate a maintenance or service call with respect to air handling system 100. In this illustrative example, additional sensors 232 include Temperature and humidity sensors that allow airflow sensor 122 to now monitor the health of air handling system 100. Airflow monitor 902 can automatically perform operation 914 that alert the homeowner as well as service provider 912. For example, when service provider 912 is an HVAC technician, airflow monitor 902 can contact service provider 912 with the status of air handling system 100, for example that there is a Freon leak or the heat is not working, and automatically schedule a service call.

Alternatively, or in addition to the above operation 914, airflow monitor 902 can be used to generate HVAC service call referrals to service provider 912 and push HVAC tune up specials advertising by service provider 912 to the homeowner at predetermined times, such as before the peak times of the year that air handling system 100 operates.

The illustrative example in FIG. 9 and the examples in the other previous figures provide one or more technical solutions to overcome a technical problem of determining an airflow volume through an air filter that make the performance of operations more cumbersome and time-consuming than desired. In this manner, the use airflow monitor 902 in conjunction with airflow sensor 122 has a technical effect of determining an airflow volume through an air filter based on monitoring information provided by airflow sensor 122, thereby reducing time, effort, or both in the performance of operations 914. As a result, computer system 904 operates as a special purpose computer system in which airflow monitor 902 in computer system 114 enables the performance of operations 914. Thus, airflow monitor 902 transforms computer system 904 into a special purpose computer system as compared to currently available general computer systems that do not have airflow monitor 902. Currently used general computer systems do not reduce the time or effort needed to perform operations 914 based on monitoring information provided by airflow sensor 122.

Figure 10:
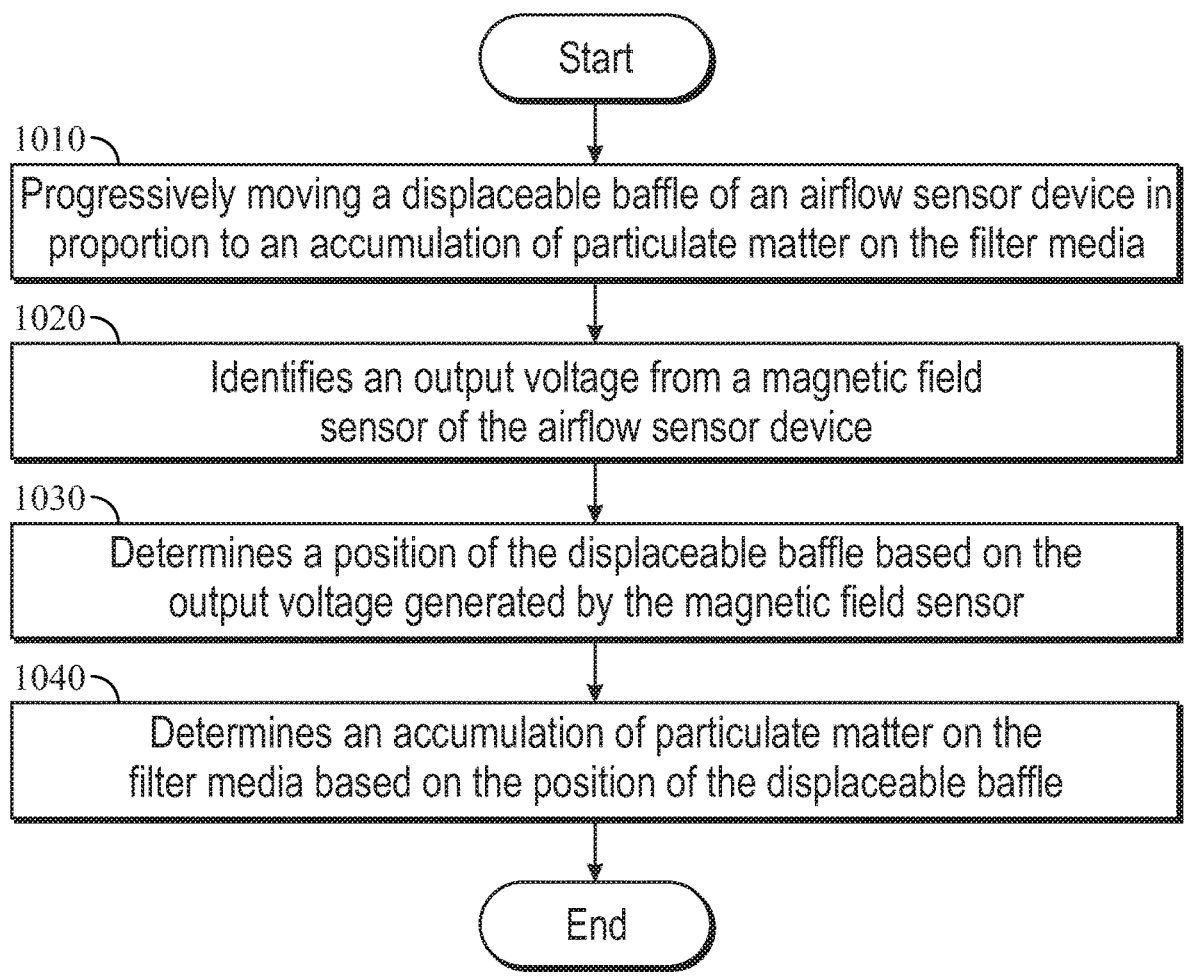
FIG. 10 is a flowchart of a process for determining an airflow volume through an air filter in accordance with illustrative embodiment.

With reference next to FIG. 10, an illustration of a flowchart of a process for determining an airflow volume through an air filter is depicted in accordance with an illustrative embodiment. The process of FIG. 10 can be implemented in in airflow sensor 122 of FIG. 1.

The process begins by progressively moving a displaceable baffle of an airflow sensor device in proportion to an accumulation of particulate matter on the filter media (step 1010). The displaceable baffle is movably mounted within a bypass conduit of an airflow sensor device.

The process identifies an output voltage from a magnetic field sensor of the airflow sensor device (step 1020). The output voltage is proportional to a magnetic flux density of a magnetic field from an actuation magnet mounted on the displaceable baffle.

The process determines a position of the displaceable baffle based on the output voltage generated by the magnetic field sensor (step 1030).

The process determines an accumulation of particulate matter on the filter media based on the position of the displaceable baffle (step 1040), the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
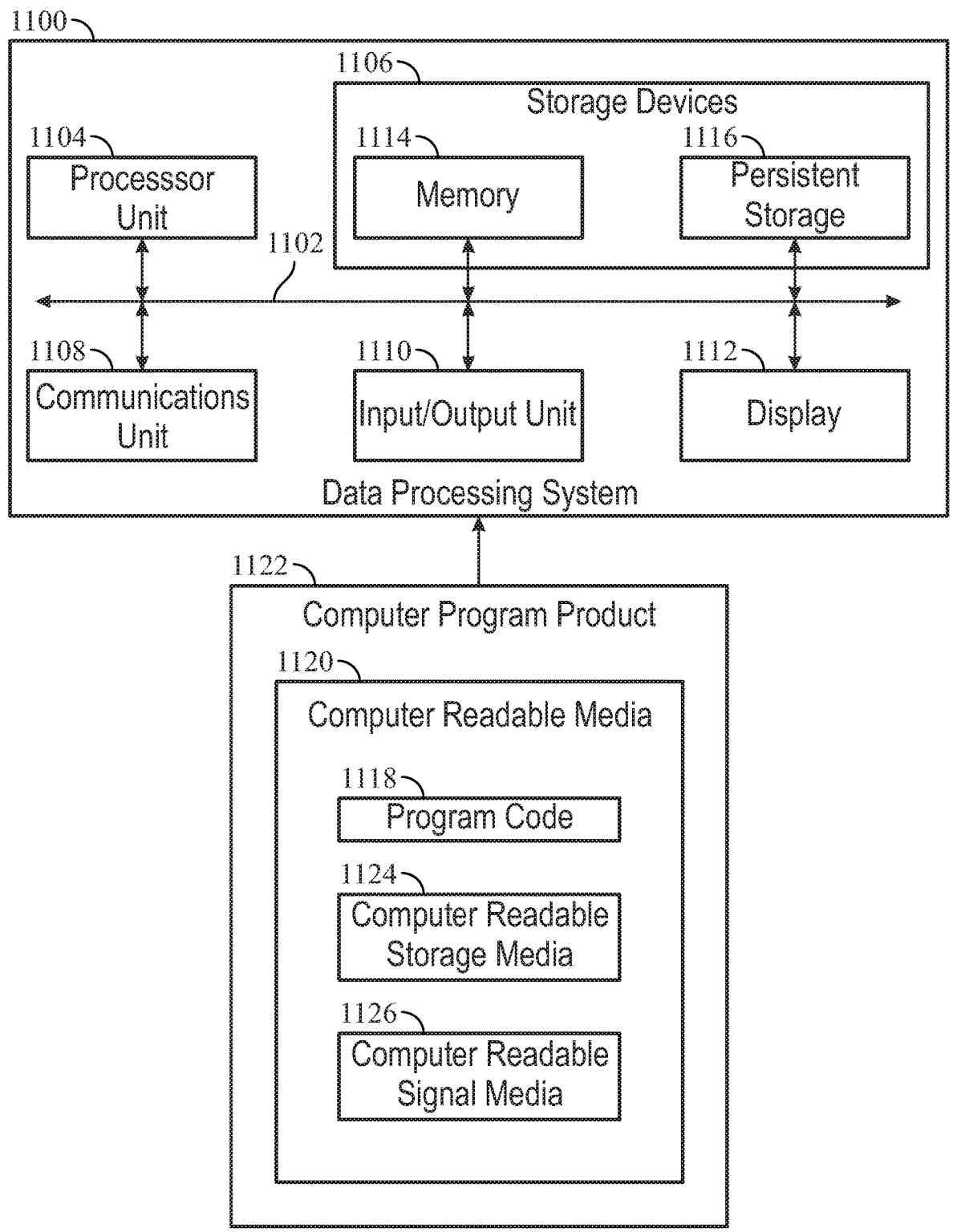
FIG. 11 is a block diagram of a data processing system in accordance with an illustrative embodiment.

Turning now to FIG. 11, a block diagram of a data processing system is depicted in accordance with an illustrative embodiment. Data processing system 1100 may be used to implement computer system 904 in FIG. 9. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid-state drive (SSD), a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An airflow sensor device comprising:
a sensor housing having a conduit;
a displaceable baffle, movably mounted within the conduit,
a magnetic field sensor, mounted within the sensor housing, configured to generate an output voltage; and
an embedded processing system, mounted within the sensor housing and operatively connected to the magnetic field sensor, configured to determine a position of the displaceable baffle based on the output voltage generated by the magnetic field sensor,
wherein the displaceable baffle is a magnetically-biased check valve.

2. The airflow sensor device of claim 1, wherein the conduit extends from a first side of the sensor housing to a second side of the sensor housing.

3. The airflow sensor device of claim 1, wherein the displaceable baffle is configured to move within the conduit in response to a pressure differential across the displaceable baffle.

4. The airflow sensor device of claim 1, wherein the magnetic field sensor generates the output voltage in proportion to a magnetic flux density of a magnetic field from an actuation magnet mounted on the displaceable baffle.

5. The airflow sensor device of claim 4, wherein the magnetic field sensor is a number of linear Hall effect sensors.

6. The airflow sensor device of claim 1, wherein the magnetically-biased check valve is proximately attached to the conduit via a hinge, and wherein the magnetically-biased check valve moves within the conduit via rotation around the hinge.

7. The airflow sensor device of claim 1, wherein the magnetically-biased check valve is centrally mounted within the conduit via a central axis, and wherein the magnetically-biased check valve moves within the conduit via linear displacement along the central axis.

8. An air filter comprising:
a filter media; and
an airflow sensor device, attached to the filter media, comprising:
a sensor housing having a bypass conduit configured for air flow around (or bypassing) the filter media;
a displaceable baffle, movably mounted within the bypass conduit;
a magnetic field sensor, mounted within the sensor housing, configured to generate an output voltage; and an embedded processing system, mounted within the sensor housing and operatively connected to the magnetic field sensor, configured to determine a position of the displaceable baffle based on the output voltage generated by the magnetic field sensor;

wherein the displaceable baffle progressively moves within the bypass conduit in response to changes to a pressure differential across the displaceable baffle in proportion to an accumulation of particulate matter on the filter media, and wherein the displaceable baffle is a magnetically-biased check valve.

9. The air filter of claim 8, wherein the bypass conduit extends from a first side of the sensor housing to a second side of the sensor housing.

10. The air filter of claim 8, wherein the displaceable baffle is configured to move within the bypass conduit in response to a pressure differential across the displaceable baffle.

11. The air filter of claim 8, wherein the magnetic field sensor generates the output voltage in proportion to a magnetic flux density of a magnetic field from an actuation magnet mounted on the displaceable baffle.

12. The air filter of claim 11, wherein the magnetic field sensor is a number of linear Hall effect sensors.

13. The air filter of claim 8, wherein the magnetically-biased check valve is proximately attached to the bypass conduit via a hinge, and wherein the magnetically-biased check valve moves within the bypass conduit via rotation around the hinge.

14. The air filter of claim 8, wherein the magnetically-biased check valve is centrally mounted within the bypass conduit via a central axis, and wherein the magnetically-biased check valve moves within the bypass conduit via linear displacement along the central axis.

15. An air handling system comprising:
a fan configured to create a negative pressure within a system housing;
an air filter having a filter frame circumscribing a filter media; and
an airflow sensor device, attached to the filter media, comprising:
a sensor housing having a bypass conduit configured for air flow bypassing the filter media that extends from a first side of the sensor housing to a second side of the sensor housing;
a displaceable baffle, movably mounted within the bypass conduit, wherein the displaceable baffle is configured to move within the bypass conduit in response to a pressure differential across the displaceable baffle;
a magnetic field sensor, mounted within the sensor housing, configured to generate an output voltage in proportion to a magnetic flux density of a magnetic field from an actuation magnet mounted on the displaceable baffle; and
an embedded processing system, mounted within the sensor housing and operatively connected to the magnetic field sensor, configured to determine a position of
the displaceable baffle based on the output voltage generated by the magnetic field sensor;
wherein the displaceable baffle progressively moves within the bypass conduit in response to changes of a pressure differential across the filter in proportion to an accumulation of particulate matter on the filter media; and
wherein the displaceable baffle is a magnetically-biased check valve.

16. The air handling system of claim 15, wherein the bypass conduit extends from a first side of the sensor housing to a second side of the sensor housing.

17. The air handling system of claim 15, wherein the displaceable baffle is configured to move within the bypass conduit in response to a pressure differential across the displaceable baffle.

18. The air handling system of claim 15, wherein the magnetic field sensor generates the output voltage in proportion to a magnetic flux density of a magnetic field from an actuation magnet mounted on the displaceable baffle.

19. The air handling system of claim 18, wherein the magnetic field sensor is a number of linear Hall effect sensors.

20. The air handling system of claim 15, wherein the magnetically-biased check valve is proximately attached to the bypass conduit via a hinge, and wherein the magnetically-biased check valve moves within the bypass conduit via rotation around the hinge.

21. The air handling system of claim 15, wherein the magnetically-biased check valve is centrally mounted within the bypass conduit via a central axis, and wherein the magnetically-biased check valve moves within the bypass conduit via linear displacement along the central axis.

* * * * *